Aug. 5, 1941.   F. G. PARNELL ET AL   2,251,854
INTERNAL SHOE DRUM BRAKE
Filed Feb. 7, 1940   2 Sheets-Sheet 1
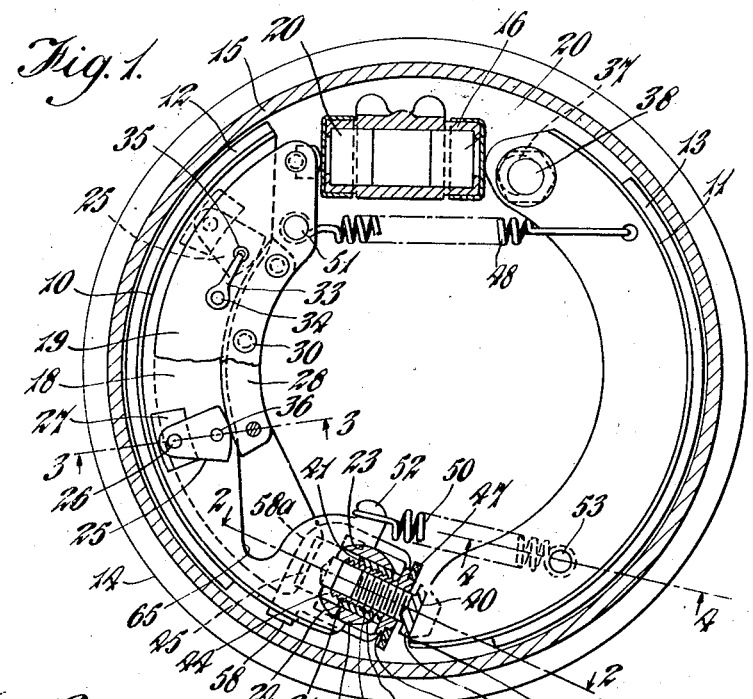
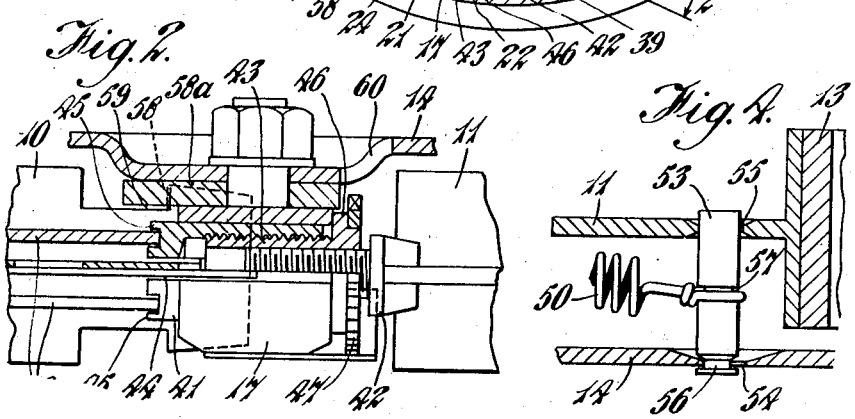
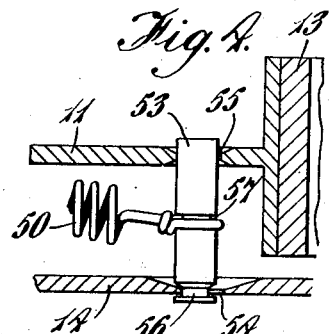
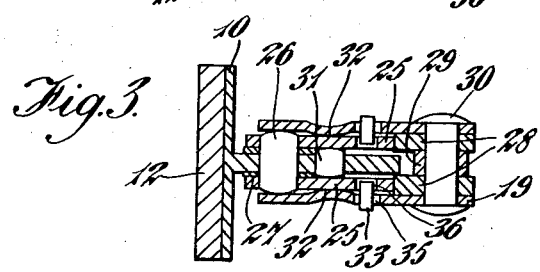
F. G. PARNELL
L. C. CHOUINGS
INVENTORS
By: Stevens and Davis
ATTY'S.

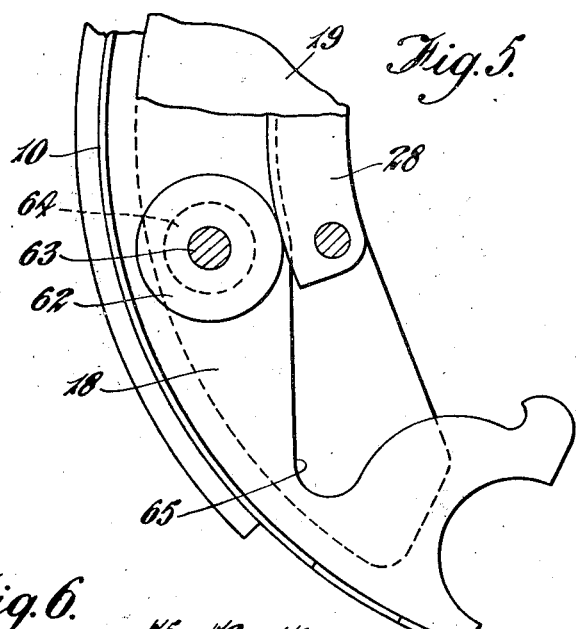
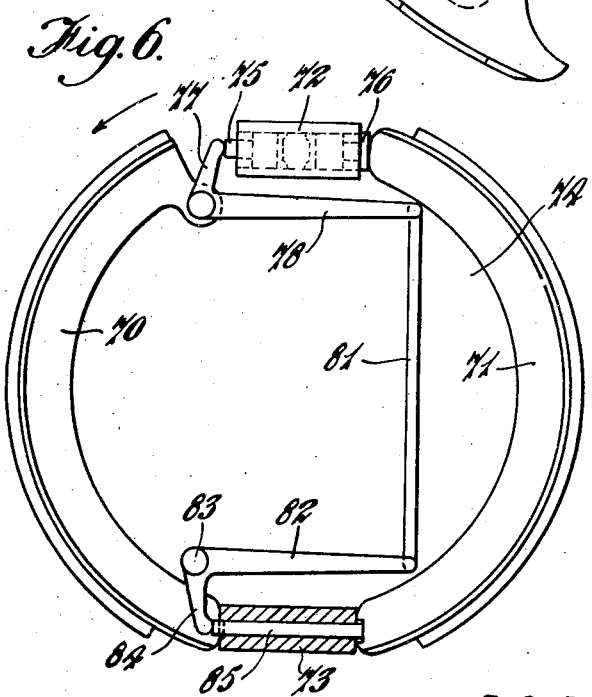

Patented Aug. 5, 1941

2,251,854

UNITED STATES PATENT OFFICE 2,251,854

INTERNAL SHOE DRUM BRAKE

Frank Gordon Parnell and Leslie Cyril Chouings, London, England, assignors to Automotive Products Company Limited, London, England Application February 7, 1940, Serial No. 317,746
In Great Britain March 21, 1939

9 Claims. (Cl. 188—78)

This invention relates to internal shoe drum brakes of the kind in which at least one shoe is arranged to act as a leading shoe in both directions of drum rotation and in which a single externally operated spreading means is mounted between one pair of adjacent ends of a pair of brake shoes, and applies a spreading force to the shoes in such a way that at least one of them is able to move circumferentially and engage either one of a pair of end abutments according to the direction of drum rotation.

The object of the invention is to provide an improved and simplified brake of this kind.

According to the invention, in an internal shoe drum brake of the kind referred to, the spreading means acts between the adjacent end of a circumferentially movable shoe and a transmission linkage connected to the remote end of the same shoe, said shoe and linkage both moving in a circumferential sense to permit the shoe to engage with one or another of two abutments at the two ends of the shoe, depending upon the direction of drum rotation, the reaction in the transmission linkage being taken by the second shoe, which is thereby applied to the drum.

According to another aspect of the invention, the spreading means acts between the adjacent end of a circumferentially movable shoe and a transmission member guided for circumferential movement on a second shoe, the transmission member being connected to the remote end of the first shoe.

According to another aspect of the invention, the brake comprises a circumferentially movable shoe engageable with one or another of a pair of abutments at its two ends depending upon the direction of drum rotation, and a spreading means mounted at one end of the said shoe to act directly on the adjacent end of the shoe and through a transmission linkage on the remote end of the same shoe, the reaction in the transmission linkage being taken by a second shoe, which is thereby applied to the drum.

The transmission linkage may be connected to the remote end of the circumferentially movable shoe through a thrust member sliding in a housing fixed to the backplate or equivalent support for the brake, and the housing may form one of the abutments for the circumferentially movable shoe, and also for the second shoe. The thrust member preferably comprises two tappets having a screw-threaded connection to a rotatable sleeve, the length of the thrust member being adjusted by rotation of the sleeve.

The transmission member may be formed with arcuate tracks engaging rollers or equivalent members pivotally attached to the second brake shoe, and the roller members may comprise sectors of rollers.

In an alternative arrangement of a brake according to the invention, the spreading means is connected to the remote end of one of the shoes through interconnected bell crank levers, one of these levers being mounted on the second shoe adjacent the spreading means, and the applying force to the second shoe being transmitted through the said bell-crank lever.

In the accompanying drawings, which show a number of forms of brake according to the invention:

Figure 1 is an elevation of one form of brake, parts being shown in section;

Figure 2 is a section on the line 2—2 of Figure 1;

Figure 3 is a section on the line 3—3 of Figure 1;

Figure 4 is a section on the line 4—4 of Figure 1;

Figure 5 is a detail view of a slightly modified form of brake; and

Figure 6 is a diagrammatic view of another form of brake.

Referring to Figures 1 to 4, the brake comprises two T-section shoes 10, 11 fitted with the usual linings 12, 13 and mounted on a fixed backplate 14, the shoes engaging, when the brake is applied, with a drum 15 carried by the rotating part of the wheel.

Mounted between one pair of adjacent ends of the shoes 10, 11 is a liquid pressure wheel cylinder 16, and between their remote ends is an abutment member 17, the cylinder 16 and abutment member 17 being both rigidly attached to the backplate 14. The web 18 of the shoe 10 lies between the two side plates of a transmission member 19 extending between the wheel cylinder and the abutment member, and engaging respectively with one of the pistons 20 in the wheel cylinder, and with a thrust member generally designated by the reference 21, this thrust member being slidable through a bore 22 in the abutment member 17. The opposite end of the thrust member engages with the shoe 11, the other end of which engages the second piston 20 in the wheel cylinder 16. The shoe 10 has a semi-circular notch 23 to engage with a cylindrical surface 24 on the abutment member, the surface 24 being formed by cutting a groove around the abutment member, which is of square section. The shoe 10 carries at two spaced points on its web pairs of sectors 25 mounted on pins 26 passing through the shoe web and through stiffening pieces 27 welded thereto, the sectors 25 lying between the web of the shoe and the side plates of the transmission member 19, and engaging with arcuate tracks 28 carried by the transmission member, the tracks being held in spaced relation by collars 29 on rivets 30 joining the plates of the transmission member. The sectors are located against sideways movement by plugs 31 passing through apertures in the shoe web 18, and by bulges 32 pressed out of the side plates of the transmission member 19, and have their rocking motion on the pins 26 limited by bent fingers 33. These are free to pivot on rivets 34 securing them to the transmission member 19, the fingers passing through clearance holes 35 in the side plates of the transmission member, and entering holes 36 in the sectors. The holes 36 in the sectors are large enough to allow a slight freedom of the sectors so that they may roll freely on the tracks 28.

The shoe 11 has a pear-shaped aperture 37 near its end which engages the wheel cylinder piston 20, and an anchor pin 38 secured in the backplate 14 passes through this aperture. The other end of the shoe is curved as at 39, and lies in a slot 40 in the end of the thrust member 21. The thrust member 21 is adjustable in length to provide a means of adjusting the brake shoes to compensate for wear of the linings, and it comprises two tappets 41, 42 engaged by right-and-left-hand threads with a rotatable sleeve 43. The tappet 41 is hollow and is threaded internally to engage an external thread on the sleeve 43, whilst the tappet 42 lies within the sleeve, and engages an internal thread thereon. The tappet 41 which fits slidably in the bore 22 of the abutment member 17, is provided with a deep diametral slot 44 to receive the end of the shoe 10 and permit that shoe to engage with the abutment member, and also with two shallower slots 45 parallel to the slot 44 in which are engaged the ends of the side plates of the transmission member 19. The slot 40 receiving the end of the shoe 11 is formed in the head of the tappet 42. The sleeve 43 has a collar 46 at the end adjacent the shoe 11, which collar engages with the end of the abutment member 17, and has a toothed rim 47 by which it may be rotated to adjust the shoes.

As will be seen in Figure 1, the axis of the thrust member 21 is inclined to the axis of the wheel cylinder 16, and it can be seen that by inclining these axes in the sense indicated, the transmission member 19 is kept as short as possible, thereby increasing its rigidity. At the same time the moment of the force transmitted to the shoe 11 through the thrust member is also increased owing to the increase in the distance between the anchor pin 38 and the line of movement of the thrust member.

The shoes are returned to their inoperative positions, and retained in those positions, by two pull-off springs 48 and 50. The spring 48 is attached at one end to a rivet 51 extending between the plates of the transmission member 19 adjacent the wheel cylinder, and at its other end to the web of the shoe 11, so that it holds the transmission member 19 and shoe 11 in engagement with the wheel cylinder pistons. The spring 50 is attached at one end to a radially inwardly projecting ear 52 on that end of the shoe 10 which engages the abutment member, while the other end of the spring engages a pin 53 (Figure 4) passing through holes 54 and 55 in the backplate 14 and shoe 11 respectively. The holes in the backplate and shoe have chamfered edges to provide knife-edges upon which the pin bears and the latter is grooved at 56 to locate it against endwise movement. The spring 50 engages a groove 57 intermediate the ends of the pin, and the pin thus acts as a lever to reduce the load on the shoe 11 in proportion to the relative distance of the spring anchorage and the shoe web from the backplate. The spring 50 holds the shoe 11 up against the tappet 42, and thus also holds the collar 46 of the thrust member 21 up against the abutment member 17, while it also applies a force to the shoe 10 tending to rotate the latter clockwise about the abutment member, and so to hold said shoe in engagement with the transmission member 19.

In operation, the shoes are applied to the drum by pressure acting in the wheel cylinder 16, which tends to force apart the adjacent ends of the shoe 11 and transmission member 19, thus expanding the "closed linkage" formed by the shoe 11, thrust member 21, transmission member 19, piston 20 and fluid column in the wheel cylinder, and engaging the shoes with the drum. If the drum is rotating in an anti-clockwise direction, the shoe 11 is urged by the drum rotation against the anchor pin 38, and the whole of the "closed linkage" tends to rotate anti-clockwise, but is restrained by the anchor pin 38. No outward movement of the piston 20 acting on the shoe 11, therefore, takes place, but the other piston 20 moves outwardly and applies a thrust to the transmission member, which moves circumferentially with relation to the shoe 10, and applies a thrust through the thrust member 21 to the remote end of the shoe 11. The reaction in the transmission member is transmitted to the shoe 10, which is thus applied to the drum. Both shoes are now acting as leading shoes. If the drum rotates in a clockwise direction, the shoe 11 is urged by the drum against the thrust member 21, and the torque from that shoe is taken through the collar 46 on the abutment member 17, the shoe moving relatively to the anchor pin 38, as such movement is allowed by the slot 37. The transmission member 19 is moved outwardly as before, but cannot move the thrust member 21 which is restrained by the braking torque. The transmission member 19 therefore operates only the shoe 10, which is restrained against circumferential movement by a stop 58 engaging a notch 59 in the shoe, the stop 58 being formed by a projecting part of a plate 58a clamped between the abutment member 17 and the backplate 14. The shoe 10 therefore acts somewhat in the manner of a trailing shoe.

Adjustment of the shoes is effected by rotating the sleeve 43, by means of a screwdriver or like tool inserted through an aperture 60 in the backplate to engage the toothed ring 47. The rotation of the sleeve causes outward movement of the two tappets 41, 42, the former of which moves the shoe 11 about its fulcrum on the anchor pin 38, whilst the latter causes outward movement of the adjacent end of the transmission member 19, which results in movement of the shoe 10 about its fulcrum on the abutment member 17, with which it is maintained in contact by the spring 50. The spring 50 also keeps the collar 46 on the sleeve 43 in engagement with the abutment member, and the adjustment is properly distributed between the two shoes, each of which moves during adjustment about the fulcrum on which it turns during a brake application with the drum rotating anti-clockwise, which is the direction during forward motion of the vehicle, and, therefore, the direction in which most of the braking occurs.

Figure 5 shows a modified arrangement in which the sectors 25 of Figure 1 are replaced by rollers 62. The rollers 62 are mounted in pairs at two or more points on the shoe 10, each pair comprising a roller on each side of the shoe web 18, and each pair being carried by a pin 63 passing through the shoe web. The web is locally stiffened by discs 64 welded thereon. The rollers lie between the web 18 of the shoe and the side plates of the transmission member 19, and roll on the tracks 28 of the transmission member.

The arcuate face of the tracks 28 on the transmission member 19 may be struck from any desired centre, and the relative movement of the transmission member 19 and shoe 10 will be equivalent to relative movement about a pivot at that centre. By varying the relative distances of the equivalent centre from the wheel cylinder 16 and the abutment member 17 the ratio between the effort applied to the transmission member by the wheel cylinder piston and the thrust transmitted to the thrust member may be varied to obtain any desired characteristics. The equivalent centre may also be chosen at a point nearer to or farther from the shoe 20 than the centre of the brake, such a variation having the effect of increasing or decreasing the curvature of the tracks 28. By moving the equivalent centre towards the transmission member, it may be brought towards a position in substantial alignment with the points of engagement of the transmission member with the piston 20 and tappet 41 respectively, thus reducing the sliding motion at the abutting surfaces when the brake is applied, but at the same time increasing the tendency for the tracks to have a wedging action between the segments 25, tending to distort the shoe 10 towards a straighter form. The position of the equivalent centre is thus selected to provide the best compromise in any given brake assembly. In Figure 1 the equivalent centre is at the centre of the brake.

The force applied to the shoe 10 through the sectors 25 or rollers 62 has a tendency to straighten the shoe, which tendency, under heavy loading, may be sufficient to produce actual temporary distortion of the shoe. Under such circumstances, the shoe, being positively located at the abutment member 17, tends to move outwards at its end adjacent the wheel cylinder, and to cause excessive wear of the lining at that end. To overcome this, the shoe web 18 may be notched as shown at 65 in Figures 1 and 5, thus giving it sufficient flexibility to allow it to distort at that point when the pressure at the other end is excessive, and distribute the load more evenly over the shoe.

The modified form of brake shown in Figure 6 has shoes 70, 71 operated by a fluid pressure wheel cylinder 72 between one pair of adjacent ends, and having an abutment member 73 between their other pair of adjacent ends, both the wheel cylinder 72 and the abutment member 73 being rigidly secured to a backplate 74. The wheel cylinder is of the double-ended type, and has two pistons 75, 76, of which the latter engages directly with the adjacent end of the shoe 71. Pivoted to the shoe 70 at its end adjacent the wheel cylinder 72 is a bell-crank lever having one arm 77 engaging the second piston 75 in the wheel cylinder, its other arm 78 extending across the backplate towards the shoe 71. Pivotally connected to the free end of the arm 78 is a tension link 81, the other end of which is connected to the arm 82 of a similar bell-crank lever pivoted at 83 on the backplate, the other arm 84 of this second bell-crank lever engaging with a push rod 85 extending through the abutment member 73 and engaging the shoe 71. The arm 84 of the second bell-crank lever is bifurcated to accommodate the web of the shoe 70, and the end of the push rod 85 is slotted to allow the shoe 70 to engage the abutment member 73. The piston 76 in the wheel cylinder 72 is shouldered to engage with the end of the cylinder. The spreading means constituted by the wheel cylinder 72 thus acts between the adjacent end of a circumferentially movable shoe 71 and a transmission linkage formed by the bell cranks 77, 78 and 82, 84 and the link 81, which linkage is connected by the push rod 85 to the remote end of the shoe 71. The shoe 71 and the linkage are both able to move in a circumferential sense to permit the shoe to engage one or other of the two abutments 76, 73 depending upon the direction of drum rotation, and the reaction in the linkage is taken by the shoe 70 through the pivot of the lever 77, 78, to apply the shoe 70 to the drum.

Pressure in the wheel cylinder 72 separates the pistons 75, 76, and thus moves the shoes outwardly to engage the drum. If the drum is rotating in an anti-clockwise direction, the shoe 71 tends to be carried around towards the wheel cylinder 72, and the torque is transmitted through the shouldered piston 76 to the wheel cylinder body. The bellcrank 77, 78 is turned about its pivot on the shoe 70, and applies a pull to the link 81, which in turn moves the second bell-crank lever 82, 84 about its pivot 83 to apply a thrust through the push rod 85 to the shoe 71. The reaction at the pivot of the lever 77, 78 on the shoe 70 moves that shoe outwardly into engagement with the drum, and both shoes act as leading shoes. If the drum is rotating in an anti-clockwise direction, the shoe 71 is moved outwardly by the piston 76, and the torque from the shoe is taken by the abutment member, thus preventing movement of the push rod. The lever 82, 84 is thus prevented from moving, and the thrust of the piston 75 is transmitted through the lever 77, 78 to the shoe 70. The shoe 71 is now acting as a leading shoe, and the shoe 70 as a trailing shoe.

What we claim is:

1. An internal shoe drum brake comprising a circumferentially movable shoe engageable with one or other of a pair of abutments at its two ends, depending upon the direction of drum rotation, a spreading means mounted at one end of the said shoe to act directly on the adjacent end of the shoe, a transmission linkage connecting the remote end of the same shoe with the said spreading means, a second shoe which is applied to the drum by the reaction in the transmission linkage, and a thrust member sliding in a housing fixed to the backplate of the brake, which thrust member connects the transmission linkage to the said remote end of the circumferentially movable shoe, said thrust member comprising two tappets which engage respectively with screw threads on the exterior and interior of a rotatable sleeve, whereby the length of the thrust member is adjustable by rotation of the sleeve.

2. An internal shoe drum brake according to claim 1, wherein a shoulder is formed on the rotatable sleeve of the thrust member, and engages with the end of the housing adjacent the circumferentially movable shoe.

3. An internal shoe drum brake comprising a circumferentially movable shoe, a second shoe, a transmission member guided for circumferential movement on said second shoe, spreading means mounted between one end of said circumferentially movable shoe and the adjacent end of said transmission member, and a thrust connection between the other end of said circumferentially movable shoe and the other end of said transmission member.

4. An internal shoe drum brake comprising a circumferentially movable shoe, a pair of fixed abutments, one at each end of the said shoe with one or the other of which the shoe is engageable according to the direction of drum rotation, a spreading means mounted at one end of the shoe, a transmission linkage, the spreading means acting directly on the adjacent end of the shoe and through the transmission linkage on the remote end of the shoe, a second shoe receiving the reaction in the transmission linkage, and a pull-off spring arranged between the two shoes near their ends remote from the spreading means, said spring applying a greater pull to one shoe than to the other.

5. An internal shoe drum brake comprising a fixed supporting plate, a circumferentially movable shoe, a pair of abutments fixed on the supporting plate one at each end of the said shoe with one or the other of which the shoe is engageable according to the direction of drum rotation, a spreading means mounted at one end of the shoe, a transmission linkage, the spreading means acting directly on the adjacent end of the shoe and through the transmission linkage on the remote end of the shoe, a second shoe receiving the reaction in the transmission linkage, a pin extending between the circumferentially movable shoe and the fixed supporting plate and having a rocking engagement with both, and a pull-off spring one end of which is attached to the pin intermediate its ends, whilst the other end is attached to the second shoe whereby the spring applies a greater pull to the second shoe than to the circumferentially movable shoe.

6. An internal shoe drum brake comprising a circumferentially movable shoe, a second shoe, a transmission member, arcuate tracks on said transmission member, rollers pivotally attached to the second brake shoe and engaging said arcuate tracks to permit relative circumferential movement of the transmission member and the second brake shoe, spreading means mounted between one end of the circumferentially movable shoe and the adjacent end of the transmission member, and a thrust connection between the other end of said circumferentially movable shoe and the other end of said transmission member.

7. An internal shoe drum brake according to claim 6, wherein the rollers comprise sector-shaped members pivoted at the centers of curvature of their arcuate surfaces.

8. An internal shoe drum brake according to claim 6, wherein the rollers comprise sector-shaped members pivoted at the centers of curvature of their arcuate surfaces, and cranked fingers pivotally mounted on the transmission member engage recesses in the sector-shaped members to locate the said members.

9. An internal shoe drum brake comprising a fixed supporting plate, spreading means mounted on said plate, a shoe abutment adjacent the spreading means, a housing fixed on said plate substantially diametrically opposite to said spreading means, a circumferentially movable shoe mounted between said shoe abutment and said housing and adapted to engage with either the abutment or the housing according to the direction of drum rotation, a thrust member passing through the housing, a transmission linkage between the spreading means and the thrust member through which the spreading means acts on the remote end of the circumferentially movable shoe, and a second shoe actuated by the spreading means through the transmission linkage, the said second shoe being pivotally located on said housing and comprising a lining-supporting rim and a web, said web being notched adjacent the housing to increase the flexibility of the shoe at that point, and permit it to distort to relieve excessive pressure at the remote end of the shoe.

FRANK GORDON PARNELL.
LESLIE CYRIL CHOUINGS.